3,766,170
3-BENZAZEPINES AND SALTS THEREOF
Anton Mentrup, Kurt Schromm, Ernst-Otto Renth, and Richard Reichl, Ingelheim am Rhein, Germany, assignors to Boehringer Ingelheim G.m.b.H., Ingelheim am Rhein, Germany
No Drawing. Filed Mar. 25, 1971, Ser. No. 128,170
Claims priority, application Germany, Apr. 4, 1970, P 20 16 136.8
Int. Cl. C07d 41/08
U.S. Cl. 260—239 BB            7 Claims

ABSTRACT OF THE DISCLOSURE

Compounds of the formula

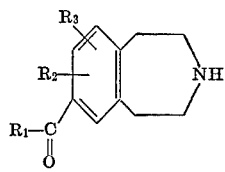

wherein $R_1$ is alkyl of 1 to 6 carbon atoms or trifluoromethyl, and $R_2$ and $R_3$, which may be identical to or different from each other, are each hydrogen or methyl, and non-toxic, pharmacologically acceptable acid addition salts thereof; the compounds as well as their salts are useful as appetite-curbers.

---

This invention relates to novel 7-alkanoyl-1,2,4,5-tetrahydro-(3H)-3-benzazepines and non-toxic acid addition salts thereof, as well as to a process for preparing these compounds.

More particularly, the present invention relates to a novel class of tetrahydro-benzazepines of the formula

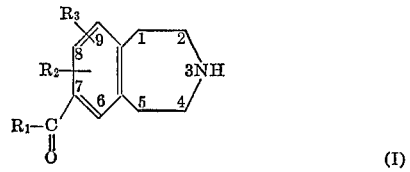

wherein $R_1$ is alkyl of 1 to 6 carbon atoms or trifluoromethyl, and $R_2$ and $R_3$, which may be identical to or different from each other, are each hydrogen or methyl, and non-toxic, pharmacologically acceptable acid addition salts thereof.

The compounds of the Formula I may be prepared by reacting a tetrahydro-benzazepine of the formula

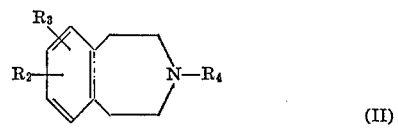

wherein $R_2$ and $R_3$ have the same meanings as in Formula I and $R_4$ is hydrogen or a protective group which may be readily removed by hydrolysis or hydrogenation, such as chloroacetyl or benzyl, or an acid addition salt thereof, with an alkanoyl halide of the formula $$R_1-\overset{O}{\underset{\|}{C}}-Y \qquad \text{(IIIa)}$$

wherein $R_1$ has the same meanings as in Formula I and Y is halogen, or with an alkanoic acid anhydride of the formula

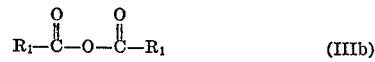

wherein $R_1$ has the same meanings as in Formula I, under the conditions of a Friedel-Crafts reaction.

More specifically, the reaction is carried out by adding the reactants II and IIIa or IIIb successively to a mixture consisting of a catalyst, such as aluminum chloride, and a solvent, such as ethylene chloride or nitrobenzene.

If $R_4$ in Formula II is a protective group, the same is removed from the reaction product in conventional manner by hydrolysis or hydrogenation. On the other hand, if $R_4$ in Formula II is hydrogen, the reactant of the Formula II is advantageously employed in the form of a salt, preferably as a hydrohalic acid addition salt.

The starting compounds for the process are all described in the literature. For instance, 1,2,4,5-tetrahydro-(3H)-3-benzazepine is obtained by hydrogenating cyclization of o-phenylene-diacetonitrile pursuant to P. Ruggli et al., Helv. Chim. Aceta 1935, vol. 18, page 1388.

The starting compounds of the Formula II wherein $R_4$ is a protectvie group may, for example, be prepared by reacting a 1,2,4,5 - tetrahydro-(3H)-3-benzazepine of the Formula II wherein $R_4$ is hydrogen with an acid halide, an acid anhydride or a benzyl halide.

The compounds embraced by Formula I above are organic bases and therefore form acid addition salts with inorganic or organic acids. Examples of non-toxic, pharmacologically acceptable acid addition salts are those formed with hydrohalic acids, sulfuric acid, nitric acid, phosphoric acid, formic acid, acetic acid, propionic acid, oxalic acid, succinic acid, tartaric acid, citric acid, maleic acid, ascorbic acid, salicylic acid, methanesulfonic acid, toluenesulfonic acid, cyclohexylsulfonic acid, pamoic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

7-propionyl-1,2,4,5-tetrahydro-(3H)-3-benzazepine 22 gm. of 1,2,4,5-tetrahydro-(3H)-3-benzazepine hydrochloride were added to a mixture consisting of 40 gm. of aluminum chloride and 110 ml. of absolute ethylene chloride, while cooling. Thereafter, while stirring, 10.5 ml. of propionyl chloride were added, and the resulting mixture was refluxed for 15 minutes, while stirring. Subsequently, the reaction mixture was admixed with ice water, the aqueous phase was separated and made alkaline with sodium hydroxide, the precipitate formed thereby was taken up in ether, and the ethereal solution was distilled in vacuo, yielding 80% of theory of 7-propionyl-1,2,4,5-tetrahydro-(3H)-3-benzazepine, B.P. 115–117° C. at 0.01 mm. Hg, of the formula

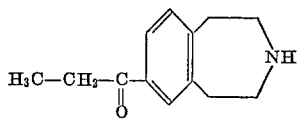

Its hydrochloride, obtained by dissolving the free base in isopropanol and acidifying the solution with hydrochloric acid, had a melting point of 204–205° C.

EXAMPLE 2

Using a procedure analogous to that described in Example 1, 7-acetyl-1,2,4,5-tetrahydro-(3H)-3-benzazepine, B.P. 112–115° C. at 0.01 mm. Hg, was prepared from 1,2,4,5-tetrahydro-(3H)-3-benzazepine hydrochloride and acetyl chloride. Its hydrochloride had a melting point of 201–202° C.

EXAMPLE 3

Using a procedure analogous to that described in Example 1, 7-butyryl-1,2,4,5-tetrahydro-(3H)-3-benzazepine, B.P. 123–125° C. at 0.03 mm. Hg, was prepared from 1,2,4,5-tetrahydro-(3H)-3-benzazepine hydrochloride and butyryl chloride.

EXAMPLE 4

Using a procedure analogous to that described in Example 1, 7-heptanoyl-1,2,4,5-tetrahydro-(3H)-3-benzazepine, B.P. 146–149° C. at 0.01 mm. Hg, was prepared from 1,2,4,5-tetrahydro-(3H)-3-benzazepine hydrochloride and heptanoyl chloride. Its hydrochloride had a melting point of 174–176° C.

EXAMPLE 5

7-propionyl-1,2,4,5-tetrahydro-(3H)-3-benzazepine 6.7 gm. of 3-chloroacetyl-1,2,4,5-tetrahydro-(3H)-3-benzazepine (M.P. 72° C.) were added to a mixture consisting of 10 gm. of aluminum chloride and 50 ml. of ethylene chloride at 10° C. Subsequently, while stirring, 3 gm. of propionyl chloride were added, and the resulting mixture was refluxed for 12 minutes, yielding 75% of theory of 7-propionyl-3-chloroacetyl-1,2,4,5-tetrahydro-(3H)-3-benzazepine, M.P. 124–125° C. (recrystallized from isopropanol). For removal of the protective group, 6 gm. of this reaction product were admixed with 1.8 gm. of thiourea and 100 ml. of water, and the mixture was heated at 65–70° C. for one hour and then evaporated. The residue was admixed with 30 ml. of water and 3 ml. of concentrated hydrochloric acid, and the resulting mixture was refluxed for 90 minutes, yielding 7-propionyl-1,2,4,5,-tetrahydro-(3H)-3-benzazepine, B.P. 118–120° C. at 0.03 mm. Hg.

EXAMPLE 6

7-acetyl-1,2,4,5-tetrahydro-(3H)-3-benzazepine 27.4 gm. of 3-benzyl-1,2,4,5-tetrahydro-(3H)-3-benzazepine hydrochloride were added to a mixture consisting of 34.5 gm. of aluminum chloride and 100 ml. of ethylene chloride, and then 7.1 ml. of acetyl chloride were added. The resulting mixture was refluxed for 15 minutes and then evaporated, yielding 7-acetyl-3-benzyl-1,2,4,5-tetrahydro-(3H)-3-benzazepine, which was acidified with hydrochloric acid and then hydrogenated at 60° C. and 5 atmospheres gauge in the presence of palladized charcoal in a mixture consisting of 2 parts methanol and 1 part water until the calculated amount of hydrogen had been absorbed. Fractional distillation in vacuo yielded 7-acetyl-1,2,4,5-tetrahydro-(3H)-3-benzazepine, B.P. 112–115° C. at 0.01 mm. Hg.

EXAMPLE 7

7-trifluoroacetyl-1,2,4,5-tetrahydro-(3H)-3-benzazepine 10 gm. of 3-chloroacetyl-1,2,4,5-tetrahydro-(3H)-3-benzazepine were added to a mixture consisting of 14.9 gm. of aluminum chloride and 100 ml. of methylene chloride at 0° C., and then, while stirring the resulting mixture at 40° C., 6 gm. of trifluoroacetyl chloride were added. The temperature of the mixture was allowed to rise slowly, so that the reaction mixture reached room temperature after 5 hours, and it was then allowed to stand at room temperature for two days. Thereafter, the reaction mixture was worked up, yielding 58% of theory of 7-trifluoroacetyl-3-chloroacetyl - 1,2,4,5 - tetrahydro-(3H)-3-benzazepine, M.P. 87–90° C. (recrystallized from cyclohexane). The protective group in the 3-position was removed in the manner described in Example 5, whereby 7-trifluoroacetyl - 1,2,4,5 - tetrahydro-(3H)-3-benzazepine, M.P. 116–121° C., of the formula

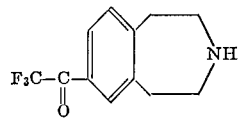

was obtained. Its hydrochloride, M.P. 225–227° C., crystallized from water with 1 mol of water of crystallization.

EXAMPLE 8

Using a procedure analogous to that described in Example 1, 7 - acetyl-6,9-dimethyl-1,2,4,5-tetrahydro-(3H)-3-benzazepine, B.P. 112–116° C. at 0.08 mm. Hg, of the formula

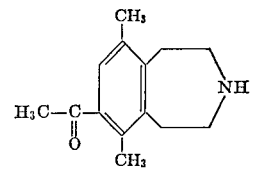

was prepared from 6,9-dimethyl-1,2,4,5-tetrahydro-(3H)-3-benzazepine hydrochloride (M.P. 207–208° C.) and acetyl chloride. Its hydrochloride had a melting point of 213–214° C.

EXAMPLE 9

Using a procedure analogous to that described in Example 1, 7 - propionyl-8-methyl-1,2,4,5-tetrahydro-(3H)-3-benzazepine, B.P. 125° C. at 0.01 mm. Hg, of the formula

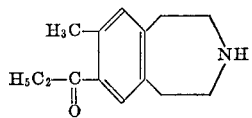

was prepared from 8 - methyl-1,2,4,5-tetrahydro-(3H)-benzazepine hydrochloride (M.P. 194–196° C.) and propionyl chloride. Its hydrochloride had a melting point of 179–180° C.

EXAMPLE 10

Using a procedure analogous to that described in Example 5, 7 - isobutyryl-1,2,4,5-tetrahydro(3H)-3-benzazepine, B.P. 125–127° C. at 0.01 mm. Hg, was prepared from 3 - chloroacetyl-1,2,4,5-tetrahydro-(3H)-3-benzazepine and isobutyryl chloride. Its hydrochloride had a melting point of 186–187° C.

The compounds according to the present invention, that is, those embraced by Formula I and non-toxic acid addition salts thereof, have useful pharmacodynamic properties. More particularly, the compounds of the instant invention exhibit very effective appetite-curbing activities without stimulating and central nervous system in warm-blooded animals, such as rats.

The anorectic activity, as well as the absence of central nervous system stimulating activities, were determined by subcutaneous administration of varying doses of the compounds of the invention to a statistically significant number of adult laboratory rats. These tests showed that the median effective anoretic dose ($ED_{50}$) of the compounds according to the present invention is from ⅛ to ¹⁄₁₈ of the median effective dose of known appetite-curbers, and that the compounds of the present invention produce no discernible CNS-stimulating effects at dosage levels of as much as 40 mgm./kg. body weight within six hours after subcutaneous injection.

For pharmaceutical purposes the compounds according to the present invention are administered to warm-blooded animals perorally as active ingredients in customary dosage unit compositions, that is, compositions in dosage unit form consisting essentially of an inert pharmaceutical carrier and one effective dosage unit of the active ingredient, such as tablets, coated pills, capsules, wafers or the like. In addition to a compound according to the instant invention, such compositions may also comprise one or more other active ingredients with a different pharmacological activity, such as a laxative compound. One effective dosage unit of the compounds according to the present invention is from 0.083 to 1.67 mgm./kg. body weight, preferably 0.083 to 0.84 mgm./kg. body weight.

The following examples illustrate a few oral dosage unit compositions comprising a compound of the present invention as an active ingredient and represent the best modes contemplated of putting the invention into practical use. The parts are parts by weight unless otherwise specified.

EXAMPLE 11

Tablets

The tablet composition was compounded from the following ingredients:

| | Parts |
|---|---|
| 7 - propionyl - 1,2,4,5-tetrahydro-(3H)-3-benzazepine hydrochloride | 10.0 |
| Lactose | 257.0 |
| Polyvinylpyrrolidone | 3.0 |
| Corn starch | 27.0 |
| Colloidal silicic acid | 2.0 |
| Magnesium stearate | 1.0 |
| Total | 300.0 |

Preparation: The ingredients were admixed with each other in customary fashion, and the mixture was compressed into 300 mgm.-tablets in a conventional tablet-making machine. Each tablet contained 10 mgm. of the benzazepine compound and was an oral dosage unit composition with effective anorectic activities.

The same results were obtained when 7-trifluoroacetyl-1,2,4,5-tetrahydro-(3H)-3-benzazepine hydrochloride was substituted for the benzazepine salt in the above tablet composition.

EXAMPLE 12

Coated pills

The pill core composition was compounded from the following ingredients:

| | Parts |
|---|---|
| 7-acetyl-1,2,4,5-tetrahydro-(3H)-3-benzazepine hydrochloride | 25.0 |
| Lactose | 242.0 |
| Polyvinylpyrrolidone | 3.0 |
| Corn starch | 27.0 |
| Colloidal silicic acid | 2.0 |
| Magnesium stearate | 1.0 |
| Total | 300.0 |

Preparation: The ingredients were admixed with each other in conventional manner, and the composition was compressed into 300 mgm.-pill cores, which were subsequently coated with a thin shell consisting of a mixture of polyvinylpyrrolidone, talcum, titanium dioxide, gum arabic and sugar, and finally polished with beeswax. Each coated pill contained 25 mgm., of the benzazepine compound and was an oral dosage unit composition with effective anorectic activities.

The same results were obtained when 7-isobutyryl-1,2,4,5 - tetrahydro - (3H)-3-benzazepine hydrochloride was substituted for benzapeine salt in the above pill core composition.

Analogous results were obtained when any one of the other benzazepines embraced by Formula I or a non-toxic acid addition salt thereof was substituted for the particular benzazepine in Examples 11 and 12. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

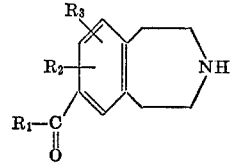

wherein
$R_1$ is alkyl of 1 to 6 carbon atoms or trifluoromethyl, and
$R_2$ and $R_3$ are each hydrogen or methyl, or a non-toxic, pharmacologically acceptable acid addition salt thereof.

2. A compound according to claim 1, which is 7-acetyl-1,2,4,5 - tetrahydro-(3H)-3-benzazepine or a non-toxic, pharmacologically acceptable acid addition salt thereof.

3. A compound according to claim 1, which is 7-trifluoroacetyl - 1,2,3,4 - tetrahydro(3H)-3-benzazepine or a non-toxic, pharmacologically acceptable acid addition salt thereof.

4. A compound according to claim 1, which is 7-propionyl - 1,2,4,5-tetrahydro-(3H)-3-benzazepine or a non-toxic, pharmacologically acceptable acid addition salt thereof.

5. A compound according to claim 1, which is 7-butyryl-1,2,4,5 - tetrahydro-(3H)-3-benzazepine or a non-toxic, pharmacologically acceptable acid addition salt thereof.

6. A compound according to claim 1, which is 7-heptanoyl - 1,2,4,5 - tetrahydro-(3H)-3-benzazepine or a non-toxic, pharmacologically acceptable acid addition salt thereof.

7. A compound according to claim 1, which is 7-isobutyryl-1,2,4,5-tetrahydro-(3H)-3-benzazepine or a non-toxic, pharmacologically acceptable acid addition salt thereof.

References Cited

UNITED STATES PATENTS 3,093,632   6/1963   Mull   260—239 BB

ALTON D. ROLLINS, Primary Examiner

U.S. Cl. X.R.

260—253; 424—232, 244, 253